United States Patent
Fujita et al.

(10) Patent No.: US 7,756,466 B2
(45) Date of Patent: Jul. 13, 2010

(54) AUDIO CONTROL APPARATUS, AUDIO SYSTEM, AND NAVIGATION APPARATUS

(75) Inventors: Teruhiko Fujita, Anjo (JP); Takeshi Iwase, Aichi-gun (JP)

(73) Assignee: DENSO CORPORATION, Kariya (JP)

( * ) Notice: Subject to any disclaimer, the term of this patent is extended or adjusted under 35 U.S.C. 154(b) by 512 days.

(21) Appl. No.: 11/889,211

(22) Filed: Aug. 9, 2007

(65) Prior Publication Data

US 2008/0039034 A1 Feb. 14, 2008

(30) Foreign Application Priority Data

Aug. 11, 2006 (JP) ............................. 2006-220236
Aug. 11, 2006 (JP) ............................. 2006-220237
Aug. 11, 2006 (JP) ............................. 2006-220238

(51) Int. Cl.
H04B 1/18 (2006.01)
(52) U.S. Cl. ...................... 455/3.02; 455/18; 455/186.1
(58) Field of Classification Search ................ 455/3.01, 455/3.02, 3.04, 16, 18, 45, 179.1, 181.1, 455/185.1, 186.1; 386/46, 124, 125; 369/7, 369/30.24
See application file for complete search history.

(56) References Cited

U.S. PATENT DOCUMENTS

| | | | |
|---|---|---|---|
| 6,018,504 A * | 1/2000 | Sakamoto et al. | ........ 455/186.1 |
| 6,937,814 B1 * | 8/2005 | Chasen | ........................ 386/46 |
| 7,512,041 B2 * | 3/2009 | Nakae | ............................. 369/7 |
| 2006/0079975 A1 | 4/2006 | Ozaki | |
| 2007/0118865 A1 | 5/2007 | Saito | |

FOREIGN PATENT DOCUMENTS

| | | |
|---|---|---|
| JP | A-05-274819 | 10/1993 |
| JP | A-10-261267 | 9/1998 |
| JP | A-2001-275070 | 10/2001 |
| JP | A-2002-319226 | 10/2002 |
| JP | A-2002-344824 | 11/2002 |
| JP | A-2002-354354 | 12/2002 |
| JP | A-2004-080275 | 3/2004 |
| JP | A-2005-301195 | 10/2005 |

* cited by examiner

Primary Examiner—Thanh C Le
(74) Attorney, Agent, or Firm—Posz Law Group, PLC

(57) ABSTRACT

According to a user's recording instruction, a navigation apparatus acquires reception data (music information and identification information) from a satellite digital radio apparatus on a tune basis and records the data on a hard disk. After the recording is complete, the navigation apparatus uses a size of the reception data recorded on the hard disk to determine whether or not the recording is interrupted in the middle of a tune. When the recording is interrupted, the navigation apparatus registers the tune's identification information to an interrupted recording list. The navigation apparatus then acquires identification information about a tune being received from the satellite digital radio apparatus. When the interrupted recording list registers the identification information, that is, the recording-interrupted music is rebroadcast, the navigation apparatus acquires reception data from the satellite digital radio apparatus and re-records it on the hard disk.

27 Claims, 7 Drawing Sheets

AUDIO CONTROL APPARATUS, AUDIO SYSTEM, AND NAVIGATION APPARATUS

CROSS REFERENCE TO RELATED APPLICATIONS

This application is based on and incorporates herein by reference Japanese Patent Applications No. 2006-220236 filed on Aug. 11, 2006, No. 2006-220237 filed on Aug. 11, 2006, and No. 2006-220238 filed on Aug. 11, 2006.

FIELD OF THE INVENTION

The present invention relates to an audio control apparatus, an audio system, and a navigation apparatus using music information received and restored by a receiver for receiving airwaves.

BACKGROUND OF THE INVENTION

Conventionally, there has been known a satellite digital radio broadcast that uses an artificial satellite to deliver music information as an audio signal for music and identification information about the music such as tune name, artist name, category name, and data size (or replay time).

The satellite digital radio broadcast can detect a tune name or an artist name of the currently broadcast music from the identification information. A display device for displaying the information is generally provided for an audio apparatus that receives the broadcast and generates sounds (e.g., see Patent Document 1).

Conventionally, the following apparatus for recording broadcast signals is proposed (e.g., see Patent Document 2). The recording apparatus temporarily records a received broadcast signal on a recording medium. The apparatus determines whether or not a user needs to record the temporarily recorded broadcast signal as music. When the user needs to record that music, the apparatus finally records the music from the beginning using the temporarily recorded broadcast signal.

When the proposed recording apparatus is built in an audio apparatus for receiving the satellite digital radio broadcast, the user can record the currently broadcast music from the beginning by listening to the radio broadcast (music) and entering a recording instruction. Since the display device displays identification information about the on-air music, the user can record a favorite artist's tune by viewing the display.

(First Problem)

When the music information is acquired from the radio broadcast and is recorded on a recording medium, an electromagnetic interference such as fading may interrupt the recording in the middle of the music (tune). An audio apparatus mounted in a mobile object is often subject to this problem. Such audio apparatus interrupts the recording in the middle of a tune when a mobile object enters a place where no radio is available, or reaches a destination to turn off the audio apparatus.

When the recording is interrupted in the middle of one tune and the user is unaware of this during the recording, the user does not notice the interrupted recording until replaying the recorded tune. Even when the user notices the interrupted recording, the user needs to wait for the interrupted music (tune) to be replayed by listening to the satellite digital radio broadcast. When the intended tune is broadcast, the user needs to reenter a recording instruction. Re-recording the music (tune) is cumbersome and time-consuming.

(Second Problem)

An audio apparatus having a radio reception function and a recording function generally stops a radio reception unit while replaying a recorded tune or generating an audio (music) from an information source other than the radio unit such as music tape, music CD, and MD.

The audio apparatus receiving the satellite digital radio broadcast may be provided with the recording function and may generate a sound other than that from the radio set. In such case, even though the satellite digital radio broadcast supplies the music the user wants to record, he or she cannot notice it and loses a chance to record the music.

Patent Document 2 solves this problem by constructing the audio apparatus (recording apparatus) as follows. The audio apparatus compares a user-registered recording keyword (recording information such as an artist name or a category) with identification information about the music delivered by the satellite digital radio broadcast. In this manner, the audio apparatus detects the broadcast of the music (tune) the user wants to record and automatically records the on-air music (tune) during the detection.

To do this, however, the user needs to enter a keyword for recording and feels this operation bothersome. Entering the keyword automatically records only the music (tune) that matches the keyword. The user cannot always record the music (tune) he or she wants.

(Third Problem)

As mentioned above, the satellite digital radio broadcast delivers not only the music information but also the identification information about the music. The audio apparatus capable of receiving and recording the broadcast records both the received music information and identification information on a recording medium. The audio apparatus therefore allows the user to easily retrieve intended music information from the recorded information using the identification information (e.g., see Patent Documents 2 and 3).

Another known audio apparatus acquires music information from an information source such as a music CD other than the radio broadcast and supplies identification information to the music information for recording on a recording medium. After the recording, targeted music information can be easily retrieved.

When a conventional audio apparatus generates a sound based on the music information delivered by the satellite digital radio broadcast, the apparatus can notify the user of the currently played music's tune name or artist name using the identification information delivered along with the music information. While reproducing the music information recorded on a recording medium, the apparatus can notify the user of the currently played music's tune name or artist name using the identification information recorded with the music information. However, the apparatus cannot notify the user of the relationship between the on-air music and the music recorded on the recording medium.

For example, the user may listen to the recorded music during the broadcast of another piece of music belonging to a category the user is interested in. The user cannot notice the music of that category was broadcast.

Even though the radio broadcast delivers the music information for audio output and the identification information representing the category, the identification information is not used effectively.

Patent Document 1: JP-2006-109233 A
Patent Document 2: JP-2005-332475 A
Patent Document 3: JP-2004-80275 A

SUMMARY OF THE INVENTION

A first object of the invention is to allow an audio system capable of recording music information provided by radio broadcasting to easily re-record a recording-interrupted tune when it is rebroadcast afterwards.

A second object of the invention is to allow a user to recognize and record on-air music based on identification information of music information restored from a broadcast signal even when a corresponding audio is not outputted or generated.

A third object of the invention is to use identification information supplied to music information, correlate music information acquired from different information sources with each other, and improve convenience for a user to use these pieces of music information.

To achieve the first object, an audio control apparatus as a first example acquires music information from a reception apparatus and records it on a recording medium. At this time, an interrupt listing unit acquires identification information corresponding to the music information. The audio control apparatus then determines whether or not one tune of the music information is recorded on the recording medium. When one tune of the music information is not recorded, the audio control apparatus stores the identification information acquired from the reception apparatus as interrupt identification information, which is identification information about the incompletely recorded music, in an interrupt list storage unit.

When the interrupt listing unit allows the interrupt list storage unit to store the identification information about the incompletely recorded music, a determination unit sequentially acquires identification information about music being received from the reception apparatus and determines whether or not the identification information matches identification information stored in the interrupt list storage unit.

When the determination unit determines a match between the identification information, a first re-recording unit acquires music information from the reception apparatus and records it on the recording medium. When it is determined thereafter that one tune of the music information is recorded on the recording medium, the first re-recording unit deletes identification information about recorded music from the interrupt list storage unit.

When the audio control apparatus acquires music information from the reception apparatus and records it on the recording medium, an electromagnetic interference may interrupt recording of the music information. In such case, the interrupted recording list records identification information about the recording-interrupted music. When the reception apparatus receives music information corresponding to the same identification information as that registered to the interrupted recording list, the music information is automatically recorded (re-recorded) on the recording medium.

Even when an electromagnetic interference interrupts recording of specified music (tune), a user can subsequently record that music (tune) to the end without any operation. The usability of the apparatus can be improved.

When the determination unit determines a match between the identification information, the music information may be directly re-recorded. Alternatively, when the determination unit determines a match between the identification information, a user may be notified whether or not to re-record the music specified by the identification information. When a re-recording instruction is entered afterwards, re-recording the music information may be started. The user may be allowed to choose from these two operations.

An audio control apparatus as a second example acquires music information from a reception apparatus and records it on a recording medium. At this time, an interrupt listing unit similarly acquires identification information corresponding to the music information. The audio control apparatus then determines whether or not one tune of the music information is recorded on the recording medium. When one tune of the music information is not recorded, the audio control apparatus stores the identification information acquired from the reception apparatus as identification information about the incompletely recorded music in an interrupt list storage unit.

When the interrupt listing unit allows the interrupt list storage unit to store the identification information about the incompletely recorded music, a rebroadcasting detection unit allows a program acquisition unit to acquire program information about broadcast programs the reception apparatus can receive. The rebroadcasting detection unit detects a date of rebroadcasting the incompletely recorded music based on the program information and the identification information stored as interrupt identification information in the interrupt list storage unit.

A second re-recording unit acquires the music information about the incompletely recorded music from the reception apparatus and records the information on the recording medium at a rebroadcasting date detected by the rebroadcasting detection unit. The second re-recording unit determines whether or not one tune of the music information is recorded on the recording medium. When one tune of the music information is recorded, the second re-recording unit deletes identification information about recorded music from the interrupt list storage unit.

Even when an electromagnetic interference interrupts recording of specified music (tune), a user can subsequently record that music (tune) to the end without any operation. The usability of the apparatus can be improved.

When the rebroadcasting detection unit detects a date of rebroadcasting the incompletely recorded music, the second re-recording unit may re-record the incompletely recorded music at the detected rebroadcasting date. Alternatively, the second re-recording unit may notify a user whether or not to re-record the incompletely recorded music at the rebroadcasting date detected by the rebroadcasting detection unit. Only an instruction is supplied to re-record the music at the rebroadcasting date, the second re-recording unit may re-record the incompletely recorded music at that rebroadcasting date. The user may be allowed to choose from these two operations.

Further, two functions may be provided. One is for re-recording using program information and is embodied as the program acquisition unit, the rebroadcasting detection unit, and the second re-recording unit. The other is for re-recording using identification information restored by the reception apparatus and is embodied as the determination unit and the first re-recording unit. These two functions may be used to re-record the incompletely recorded music.

The reception apparatus can be included as a reception unit that is part of the audio control apparatus. In this case, a user may need to enter a recording instruction and reliably record one tune of music (tune) received by the reception unit. To do this, the reception unit is preferably configured as follows. The reception unit sequentially restores music information from a reception signal and concurrently stores the restored music information in a storage section. When the music information is requested, the reception unit reads the requested music information from the storage section and supplies the music information from the beginning of a tune.

As is generally known, for example, the audio system may include multiple apparatuses such as the reception apparatus and the audio control apparatus having a function needed to record the music information other than the reception apparatus' reception function.

The audio system and the audio control apparatus according to the first and second examples re-record the music information that is interrupted during recording of music information supplied from a radio broadcast. The music information recording is often interrupted in an apparatus that is mounted in a mobile object. The audio system and the audio control apparatus can be more effectively used for a mobile object or a vehicle.

The audio control apparatus need not be always dedicated to an audio system when the apparatus is mounted independently of the reception apparatus. The audio control apparatus may be implemented as one function of an onboard navigation apparatus that provides an occupant with driving guidance.

The onboard navigation apparatus includes a display section for displaying various types of information such as a road map, an input section for input operations, an audio output section for generating an audio signal for route guidance, and an arithmetic processing section for performing various control processes such as route guidance. These sections can be used as an interface for operating onboard apparatuses other than those used for route guidance. When the navigation apparatus is provided with the above-mentioned function as the audio control apparatus, the navigation apparatus can acquire music information and identification information received by the onboard reception apparatus in accordance with an instruction from the user (occupant) and record the information on a recording medium provided for the navigation apparatus. The navigation apparatus can provide the effective onboard audio control apparatus.

To achieve the second object, an audio control apparatus as a third example connects with an audio output apparatus for generating an audio and a reception apparatus for receiving an airwave containing music information as an audio signal of music and identification information about the music and for restoring music information and identification information from the received signal. In accordance with an instruction from an input unit, the audio control apparatus records music information restored by the reception apparatus on a recording medium or allows the audio output apparatus to generate an audio based on the recorded music information or the music information restored by the reception apparatus.

The audio control apparatus includes a broadcast notification unit that acquires identification information about music being or to be broadcast from the reception apparatus and notifies the user of the information. The user may enter an instruction to record the music notified by the broadcast notification unit while the audio output apparatus does not generate an audio based on the music information restored by the reception apparatus. In such case, the audio control apparatus acquires the music information from the reception apparatus and records it on the recording medium.

Even though not listening to the on-air music received by the reception apparatus, the user can use the identification information notified by the broadcast notification unit and confirm the contents of the currently broadcast music such as a tune name, artist name, and category. When needed, the user can enter the recording instruction to record the music on the recording medium. The user can expand opportunities for recording the intended music. The usability of the apparatus can be improved.

The broadcast notification unit may notify the identification information using a synthesized speech. However, the synthesized speech may interfere with the audio (music) the user listens to. It is preferable to notify the identification information using a character or a shape on a display unit. Alternatively, the user may be allowed to choose from these notification methods.

The audio control apparatus can acquire the music information from information sources such as music tape, CD, and MD other than the reception apparatus. When an instruction is entered for recording the music information from the information source, the audio control apparatus records the music information on the recording medium. When an instruction is entered for sounding the music from the information source, the audio control apparatus allows the audio output apparatus to generate an audio based on the music information from the information source.

The audio output apparatus can selectively output audio (music) based on the music information recorded on the recording medium and audio (music) from the other information sources in addition to audio (music) received by the reception apparatus. The user has less opportunity to enter an instruction to record the audio (music) received by the reception apparatus while listening to it. Though not listening to the audio (music) received by the reception apparatus, however, the user can confirm the on-air music and record it. The audio control apparatus can be more effectively used.

The audio control apparatus is provided with a determination unit. When recording information is supplied via an input unit, the determination unit compares the recording information with identification information each time the broadcast notification unit acquires from the reception apparatus. The determination unit determines whether or not the music information received by the reception apparatus needs to be automatically recorded.

When the determination unit determines that the music information received by the reception apparatus needs to be automatically recorded, the audio control apparatus acquires the music information corresponding to the identification information from the reception apparatus and records the music information on the recording medium.

When the user previously supplies recording information, the music information corresponding to the recording information is automatically recorded. The usability of the apparatus can be more improved.

When the audio output apparatus does not generate an audio (music) received by the reception apparatus, the user can more reliably record the intended music using the automatic recording function and the recording function based on a user's recording instruction in response to the notified identification information.

The reception apparatus can be included as a reception unit that is part of the audio control apparatus. In this case, a user may need to enter a recording instruction to record the music received by the reception unit from the beginning. To do this, the reception unit is preferably configured as follows, for example. The reception unit sequentially restores music information from a reception signal and concurrently stores the restored music information in a storage section. When the music information is requested, the reception unit reads the requested music information from the storage section and supplies the music information from the beginning of a tune.

Further, for example, the audio system may include multiple apparatuses such as the audio output apparatus, the reception apparatus, and the audio control apparatus.

According to the audio system and the audio control apparatus as the third example, the user can record the music information delivered by the radio broadcast by confirming the contents of the music such as a tune name, artist name, and category without listening to the on-air music. Consequently, the audio control apparatus can be applied to a home-use stationary apparatus, a portable apparatus, and a mobile apparatus mounted in a mobile object.

When configured for the mobile use, the audio control apparatus need not always be dedicated to the audio system. The audio control apparatus may be implemented as one of functions of the navigation apparatus that is mounted in a vehicle and provides an occupant with driving guidance.

The onboard navigation apparatus includes a display section for displaying various types of information such as a road map, an input section for input operations, an audio output section for generating an audio signal for route guidance, and an arithmetic processing section for performing various control processes such as route guidance. These sections can be used as an interface for operating onboard apparatuses other than those used for route guidance. When the navigation apparatus is provided with the above-mentioned function as the audio control apparatus, the navigation apparatus can be used as a control apparatus that controls the onboard reception apparatus and the other audio devices and allows the audio output apparatus to generate an intended audio. The navigation apparatus can provide the effective onboard audio control apparatus.

To achieve the third object, an audio control apparatus as a fourth example connects with an audio output apparatus for generating an audio, a reception apparatus for receiving an airwave containing music information as an audio signal of music and identification information about the music and for restoring music information and identification information from the received signal, and a recording medium for recording tune data including the music information and the identification information on a tune basis. While the audio control apparatus allows the audio output apparatus to output an audio based on music information recorded on the recording medium, a first match notification unit acquires identification information corresponding to the currently audibly output music information from the recording medium. Based on the acquired identification information, the first match notification unit determines whether or not the reception apparatus receives music information belonging to the same type as the currently audibly output music. The first match notification unit notifies a user that the reception apparatus receives music information belonging to the same type as the currently audibly output music.

When listening to the music recorded on the recording medium, the user can detect that the music information with same type as the recorded music is broadcast. To listen to the broadcast, the user just needs to issue an instruction to output an audio from the reception apparatus.

Further, the audio control apparatus may function as a recording unit that records the music information restored by the reception apparatus and the identification information on the recording medium. In this case, the user can record the on-air music on the recording medium by entering a recording instruction in response to the notification from the first match notification unit.

The first match notification unit can correlate the music information received by the reception apparatus with the music information recorded on the recording medium and improve convenience for the user to use these pieces of music information.

The same type of music as the audibly output music is characterized to be identical with the latter with respect to one or more of pieces of information such as a tune name, artist name, and category acquired from the identification information. It may be preferable to allow the user to freely specify a matching criterion.

The audio control apparatus can include a second match notification unit. When the audio control apparatus allows the audio output apparatus to generate an audio based on music information restored by the reception apparatus, the second match notification unit acquires identification information corresponding to the audibly output music information from the reception apparatus. Based on the acquired identification information, the second match notification unit extracts tune data of the same type as that of currently audibly output music from tune data recorded on the recording medium. The second match notification unit notifies a user of an extraction result.

While listening to a music broadcast received by the reception apparatus, the user can easily detect that the recording medium records the same type of music, where possible. To listen to the same type of music as the on-air one, the user just needs to enter an instruction for reproducing the same type of music (i.e., tune data extracted as the same type) recorded on the recording medium.

The second match notification unit may allow for a condition for extracting tune data of the same type as the music audibly output from the recording medium and for a method of notifying an extraction result. The second match notification unit can notify whether or not the recording medium records the audibly output music, for example. When the recording medium does not record the audibly output music, the user can record it on the recording medium. Alternatively, the user can confirm the identification information about the music such as a tune name, artist name, and category and acquire the information from other information sources.

The match notification unit according to the first and second examples can improve convenience for the user to use music information from the information sources such as the reception apparatus and the recording medium.

The recording medium may include multiple recording areas for recording tune data acquired from different information sources. When the audio output apparatus outputs an audio based on music information recorded on the recording medium, a third match notification unit acquires identification information corresponding to the audibly output music information from the recording medium. Based on the acquired identification information, the third match notification unit extracts tune data of the same type as that of currently audibly output music from tune data recorded on a recording medium area different from that for the identification information. The third match notification unit notifies a user of an extraction result.

When listening to the music recorded on the recording medium, the user can detect that the music information with the same type as that music is recorded on a different area of the recording medium. For example, the user can reproduce tune data recorded on different recording areas of different information sources, i.e., tune data with different data structures, in combination with each other.

The user can use the music information received by the reception apparatus and types of music information recorded on recording areas of the recording medium and acquired from different information sources by correlating them with each other. It is possible to improve convenience for the user to use these pieces of music information.

An audio control apparatus as a fifth example includes the above-mentioned second match notification unit. Accordingly, the second match notification unit can correlate the music information received by the reception apparatus with the music information recorded on the recording medium and improve convenience for the user to use these pieces of music information.

The audio control apparatus further includes the above-mentioned third match notification unit. According to the audio control apparatus, the user can use the music information received by the reception apparatus, the music information recorded on the recording medium, and the music information recorded on recording areas of the recording medium and acquired from different information sources by correlating them with each other. It is possible to improve convenience for the user to use these pieces of music information.

An audio control apparatus as a sixth example includes the above-mentioned third match notification unit. The third match notification unit allows the user to use types of music information recorded on recording areas of the recording medium and acquired from different information sources by correlating them with each other. It is possible to improve convenience for the user to use these pieces of music information.

Further, as is generally known, the audio system may include a combination of the audio output apparatus, reception apparatus, and the audio control apparatus.

The audio control apparatus may use an independent, removable recording medium or a built-in recording medium.

The audio control apparatus may function as a recording unit that records tune data (music information and identification information) acquired from the reception apparatus and the other information sources on the recording medium in accordance with an instruction from outside. The usability of the audio control apparatus can be further improved.

The audio control apparatus as the fourth, fifth, and sixth examples may be mounted in a vehicle as a stand-alone onboard apparatus. Moreover, the audio control apparatus may be embodied as one function of the navigation apparatus that is mounted in a vehicle and provides an occupant with driving guidance.

The onboard navigation apparatus includes a display section for displaying various types of information such as a road map, an input section for input operations, an audio output section for generating an audio signal for route guidance, and an arithmetic processing section for performing various control processes such as route guidance. These sections can be used as an interface for operating onboard apparatuses other than those used for route guidance. When provided with the function as the audio control apparatus, the navigation apparatus can effectively allow a speaker as the audio output apparatus to generate an audio based on the music information received by the reception apparatus or recorded on the recording medium in accordance with an instruction from the user (occupant).

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
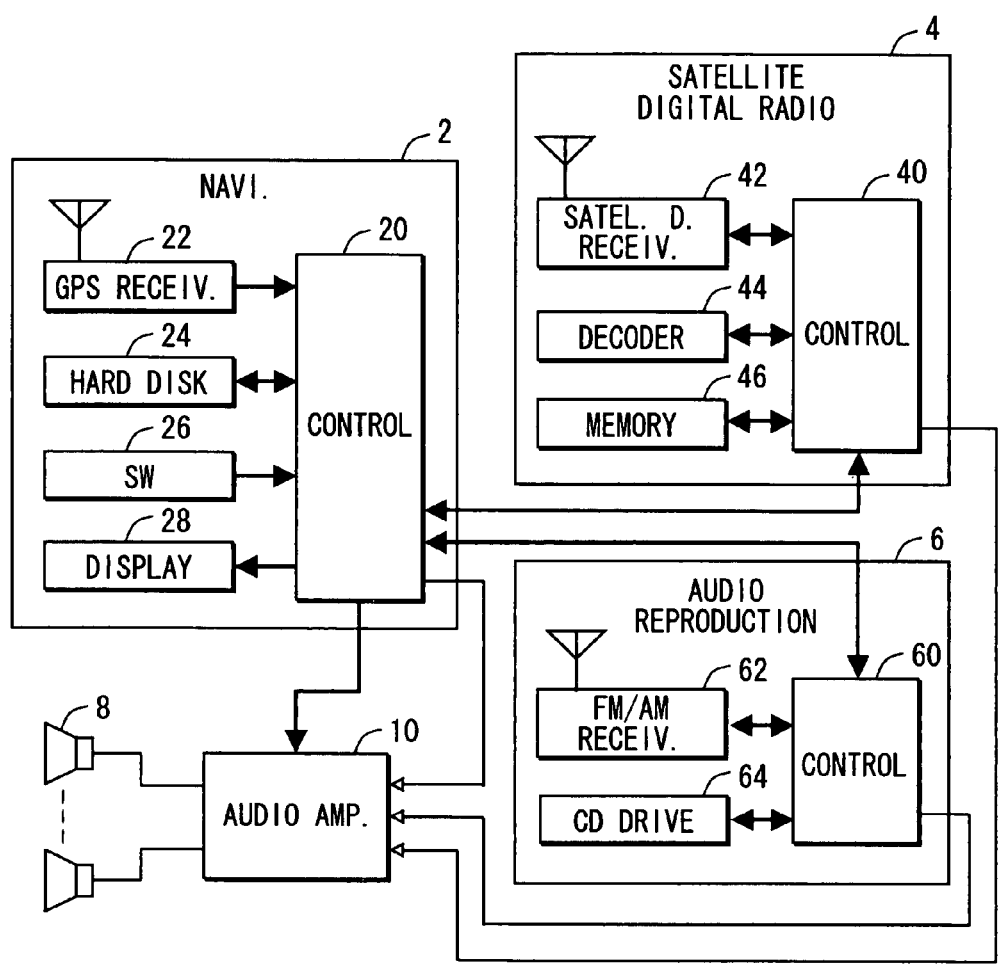
FIG. 1 is a block diagram showing the construction of an onboard multimedia system according to a first embodiment.

The following describes the first embodiment of the invention with reference to the accompanying drawings. FIG. 1 is a block diagram showing the construction of an onboard multimedia system according to the invention.

As shown in FIG. 1, the onboard multimedia system according to the first embodiment is mounted in a vehicle (car) to audiovisually guide driving and generate audio from various audio devices. The onboard multimedia system includes: a navigation apparatus 2 for controlling the driving guidance and audio output; a satellite digital radio apparatus 4 for receiving satellite digital radio broadcast and restoring music information and its identification information; an audio reproduction apparatus 6 equipped with a receiver for receiving FM and AM terrestrial analog radio broadcast and reproducing a music CD; and an audio amplifier 10 for amplifying an audio signal from the apparatuses 2, 4, and 6 and generating an audio from multiple speakers 8 provided left and right at the front and the rear of a vehicle compartment.

The navigation apparatus 2 includes: a GPS receiver 22 for receiving a radio wave transmitted from a GPS artificial satellite and detecting a vehicle's position, speed, and running direction; a hard disk 24 for prerecording map data and audio data for route guidance and realtime recording music data received by the satellite digital radio apparatus 4 and data read from a music CD; an operation switch group 26 for a user to enter various instructions; a display device 28 for displaying a road map, running route, and guidance for a user; and a control circuit 20 connected to these components.

The control circuit 20 uses a microcomputer including a CPU, ROM, and RAM. The control circuit 20 controls: the display device 28 to display a road map and a driving route for driving guidance in accordance with an instruction supplied from the operation switch group 26; the audio amplifier 10 to amplify an audio signal acquired from the hard disk 24, the satellite digital radio apparatus 4, and the audio reproduction apparatus 6 and generate audio from the speaker 8; and the hard disk 24 to record data received from the satellite digital radio apparatus 4 and CD data. According to the first embodiment, the hard disk 24 as a recording medium functions as an interrupt list storage means or unit.

The satellite digital radio apparatus 4 includes: a satellite digital radio receiver 42 that functions as a reception means or unit (or a reception apparatus), receives an airwave for the satellite digital radio broadcast using an antenna, and restores music information digitized from a music's audio signal and identification information about the on-air music from the received signal; a decoder 44 that decodes the music information and the identification information restored by the satellite digital radio receiver 42 and generates character codes for an audio signal and the music's tune name, artist name, category name, and data size (or replay time); memory 46 that temporarily stores the music information and the identification information restored by the satellite digital radio receiver 42 for a specified time period; and a control circuit 40 connected to these components.

The control circuit 40 uses a microcomputer including a CPU, ROM, and RAM. The control circuit 40 features a communication function to exchange data with the control circuit 20 of the navigation apparatus 2. It also features an audio signal output function to output an audio signal generated by the decoder 44 to the audio amplifier 10.

The control circuit 40 operates on an instruction supplied from the navigation apparatus 2, more specifically, from a user who operates the operation switch group 26 provided for the navigation apparatus 2. The control circuit 40 provides various control operations such as selecting a channel for the satellite digital radio receiver 42, allowing the decoder 44 to decode the music information or the identification information, writing received data (music information and identification information) to the memory 46, and transmitting the received data to the navigation apparatus 2. Control operations of the control circuit 40 will be described later.

The audio reproduction apparatus 6 includes: an FM/AM radio receiver 62; a CD drive 64 that reads music data from a music CD and converts the music data into an audio signal; and a control circuit 60 connected to these components.

The control circuit 60 uses a microcomputer including a CPU, ROM, and RAM. The control circuit 60 features a communication function to exchange data with the control circuit 20 of the navigation apparatus 2. It also features an audio signal output function to output an audio signal received and demodulated by the FM/AM radio receiver 62 or generated by the CD drive 64 to the audio amplifier 10.

Similarly to the control circuit 40 of the satellite digital radio apparatus 4, the control circuit 60 also operates on an instruction from the navigation apparatus 2. The control circuit 60 provides various control operations such as selecting a channel for the FM/AM radio receiver 62 and transmitting music data read from a music CD by the CD drive 64 to the navigation apparatus 2.

The audio amplifier 10 selectively amplifies audio signals output from the navigation apparatus 2, the satellite digital radio apparatus 4, and the audio reproduction apparatus 6 and outputs the signals to the speakers 8. The control circuit 20 of the navigation apparatus 2 outputs a control signal to determine selection or levels of audio signals output to the speakers 8.

Figure 2:
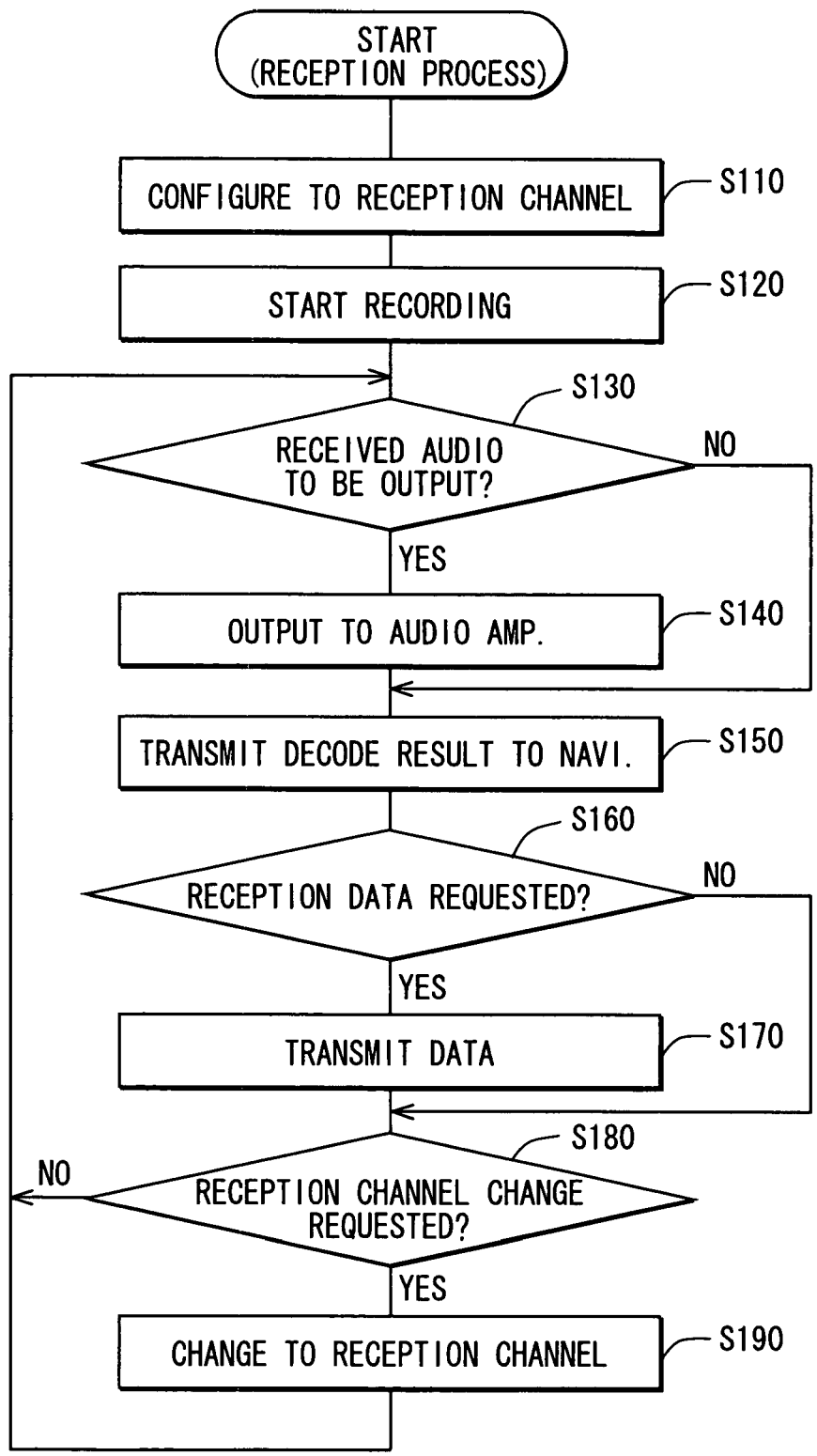
FIG. 2 is a flowchart showing a satellite digital radio reception process executed on a satellite digital radio apparatus according to the first embodiment.

FIG. 2 is a flowchart showing a satellite digital radio reception process the control circuit 40 of the satellite digital radio apparatus 4 performs repeatedly.

As shown in FIG. 2, the satellite digital radio reception process configures a selection channel for the satellite digital radio receiver 42 to a reception channel specified from the navigation apparatus 2 at S110 (S represents Step).

At S120, the process starts sequentially recording reception data, i.e., music information and identification information, restored by the satellite digital radio receiver 42, on the memory 46. The process then proceeds to S130.

When the process starts recording the reception data at S120, the reception data (music information and the identification information) restored by the satellite digital radio receiver 42 is directly transferred to the memory 46 and is sequentially stored in it. The memory 46 as a storage section is configured to have a capacity large enough to record one or more music tunes each of which replays several to ten or more minutes, for example. When writing the reception data to the memory 46 decreases a free space in it, earlier reception data is deleted to record the most recent reception data.

At S130, the process determines according to an instruction from the navigation apparatus 2 whether or not the received audio signal is configured to be output. When the received audio signal is configured to be output, the process proceeds to S140 and allows the decoder 44 to decode the music information restored by the satellite digital radio receiver 42 and output a decode result (i.e., the audio signal) to the audio amplifier 10. The process then proceeds to S150. When the received audio signal is not configured to be output, the process directly proceeds to S150.

At S150, the process allows the decoder 44 to decode the identification information restored by the satellite digital radio receiver 42 and transmit the decode result (i.e. a character code representing the on-air music's tune name, artist name, category name, and data size) to the navigation apparatus 2. The process then proceeds to S160.

At S160, the process determines whether or not the navigation apparatus 2 requests for the reception data. When the navigation apparatus 2 does not request for the reception data, the process proceeds to S180. When the navigation apparatus 2 requests for the reception data, the process proceeds to S170. The reception data signifies the music (equivalent to one tune) being currently received and written to the memory 46. The process sequentially reads the reception data from the memory 46 and transmits that data to the navigation apparatus 2. When completing transmission of the reception data equivalent to one tune, the process proceeds to S180.

At S180, the process determines whether or not the navigation apparatus 2 requests to change the reception channel. When the navigation apparatus 2 requests to change it, the process proceeds to S190. The process changes the selection channel for the satellite digital radio receiver 42 to the reception channel specified by the navigation apparatus 2 and then returns to S130. When the navigation apparatus 2 does not request to change the reception channel, the process returns to S130 and repeats the steps thereafter.

The navigation apparatus 2 may request to reproduce the reception data recorded on the hard disk 24 during execution of the satellite digital radio reception process in FIG. 2. In such case, the control circuit 40 of the satellite digital radio apparatus 4 performs a decode process. That is, the control circuit 40 allows the decoder 44 to decode reception data thereafter transmitted from the navigation apparatus 2, outputs an audio signal to the audio amplifier 10, and outputs character codes for the identification information to the navigation apparatus 2.

Figure 3:
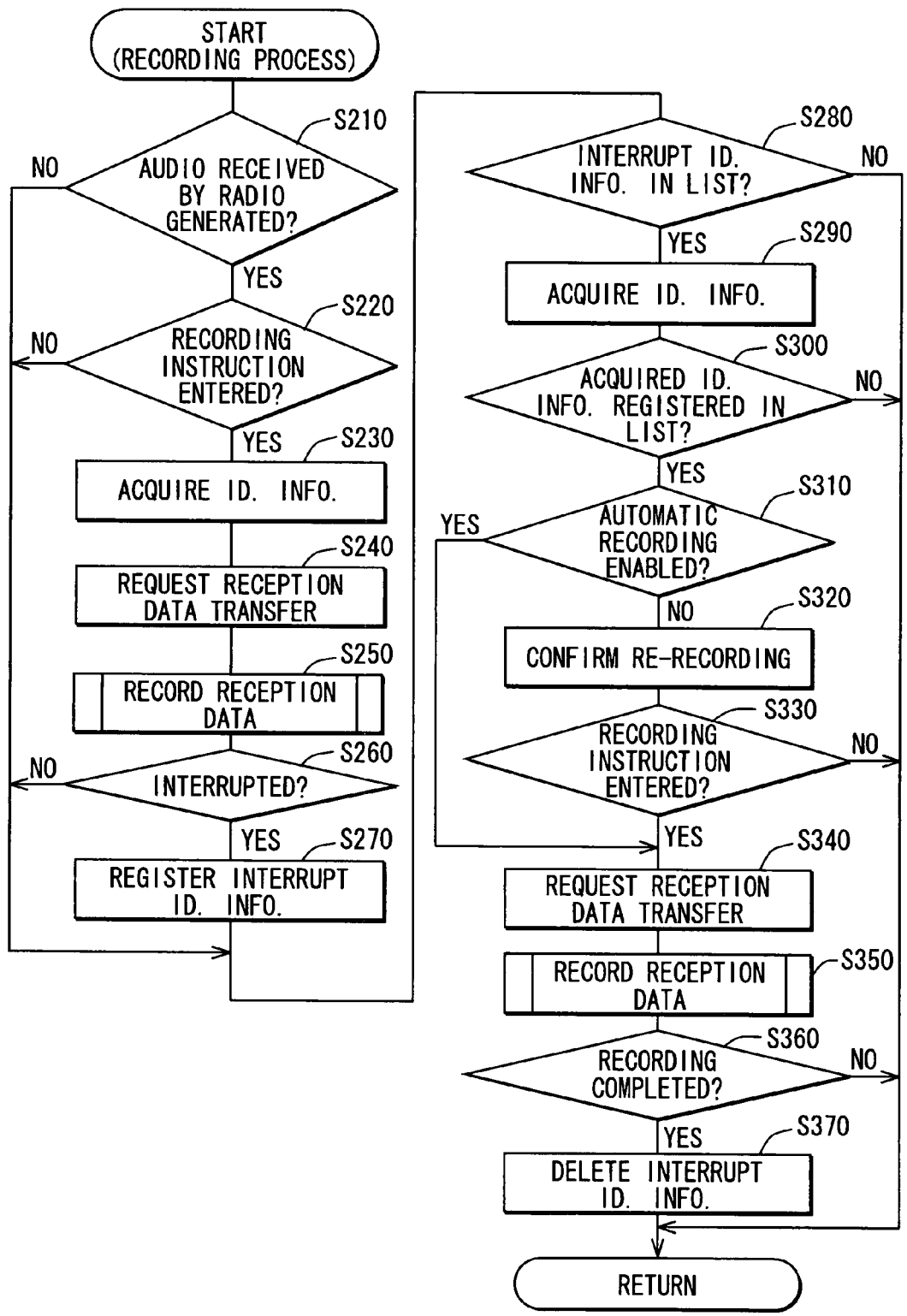
FIG. 3 is a flowchart showing a satellite digital radio recording process executed on a navigation apparatus according to the first embodiment.

FIG. 3 is a flowchart showing a satellite digital radio recording process performed on the navigation apparatus 2 to provide a function as the audio control apparatus (more specifically, as an interrupt listing means or unit, a determination means or unit, or a first re-cording means or unit).

The control circuit 20 repeatedly performs the satellite digital radio recording process along with the other control processes for display and audio output as mentioned above. When initiated, the process determines at S210 whether or not the speaker 8 currently generates audio (music) of the satellite digital radio broadcast. When the speaker 8 currently generates audio (music) of the satellite digital radio broadcast, the process proceeds to S220 or to S280 otherwise.

At S220, the process determines whether or not the operation switch group 26 is used to enter an instruction for recording the satellite digital radio broadcast. When a recording instruction is entered, the process proceeds to S230 or to S280 otherwise.

At S230, the process acquires the identification information representing the currently received music (specifically a character code decoded from the received identification information) from the satellite digital radio apparatus 4. At S240, the process transmits a reception data transfer request to the satellite digital radio apparatus 4.

When the process transmits the reception data transfer request, the satellite digital radio apparatus 4 transmits the reception data equivalent to the currently received one tune according to S170 in FIG. 2. At S250, the process acquires the reception data transmitted from the satellite digital radio apparatus 4. The process supplies the reception data with the decoded identification information (character code) acquired at S230 and records the reception data on the hard disk 24.

When completing S250, the process proceeds to S260 and compares a data size of the music information stored in the hard disk 24 with a data size acquired from the identification information, for example. In this manner, the process determines whether one tune of the music information received by the satellite digital radio apparatus 4 is recorded completely on the hard disk 24 or the recording of the music information is interrupted. When one tune of the music information is completely recorded, the process proceeds to S280. When the recording of the music information is interrupted, the process proceeds to S270 and generates an interrupted recording list. To do this, the process registers, as interrupt identification information, the identification information (i.e., the identification information or the character code acquired at S230) about the recording-interrupted music to an interrupted recording list storage area of the hard disk 24. The process then proceeds to S280.

At S280, the process determines whether or not the interrupted recording list registers the interrupt identification information about the music. Specifically, the process determines whether or not the interrupted recording list storage area of the hard disk 24 registers at least one piece of the interrupt identification information about the recording-interrupted music at S270. In other words, when the interrupted recording list registers no identification information, there is no music to be re-recorded. The satellite digital radio recording process terminates. When the interrupted recording list registers the identification information, the process proceeds to S290.

At S290, the process acquires the identification information (character code) representing the currently received music from the satellite digital radio apparatus 4. At S300, the process determines whether or not the interrupted recording list registers the identification information acquired at S290.

When the interrupted recording list does not register the identification information acquired from the satellite digital radio apparatus 4, the satellite digital radio recording process terminates. When the interrupted recording list registers, as the interrupt identification information, the identification information acquired from the satellite digital radio apparatus 4, the process proceeds to S310.

At S310, the process determines whether or not automatic recording is enabled for the music whose identification information is registered to the interrupted recording list. When the automatic recording is enabled, the process proceeds to S340 or to S320 otherwise. A user or a vehicle's occupant can enable the automatic recording by operating the operation switch group 26.

At S320, the process notifies the user of the identification information (received at S290) about the music currently received by the satellite digital radio apparatus 4. The process allows the display device 28 to display a guidance image for confirming whether or not to re-record the music.

At S330, the process determines whether or not the operation switch group 26 is used to enter a recording instruction in accordance with the guidance image. When no recording instruction is entered, the satellite digital radio recording process terminates. When a recording instruction is entered, the process proceeds to S340.

At S340, the process transmits a reception data transfer request to the satellite digital radio apparatus 4. At S350, the process acquires the reception data equivalent to one tune transmitted from the satellite digital radio apparatus 4 in accordance with the transfer request. The process supplies the reception data with the identification information (character code) acquired at S290 and records the data on the hard disk 24.

Upon completion of S350, the process proceeds to S360 and compares a data size of the music information stored in the hard disk 24 with a data size acquired from the identification information, for example. In this manner, the process determines whether one tune of the music information received by the satellite digital radio apparatus 4 is recorded completely on the hard disk 24 or the recording of the music information is interrupted.

When one tune of the music information is completely recorded, the process proceeds to S370 and deletes the identification information corresponding to the currently recorded music stored as the interrupt identification information from the interrupted recording list in the hard disk 24. The satellite digital radio recording process then terminates. When the recording of the music information is interrupted, the satellite digital radio recording process terminates.

In the onboard multimedia system according to the first embodiment, as mentioned above, the navigation apparatus 2 records the reception data (music information and identification information) restored by the satellite digital radio apparatus 42 on the hard disk 24 in accordance with a recording instruction from the user. When one tune of the reception data cannot be recorded normally, the navigation apparatus 2 registers the identification information (decoded character code) for the unsuccessfully recorded reception data to the interrupted recording list. When the satellite digital radio apparatus 4 receives the music whose identification information is registered to the interrupted recording list, the navigation apparatus 2 acquires the reception data for that music from the satellite digital radio apparatus 4 and re-records the data on the hard disk 24. The user can configure whether to automatically re-record the reception data or prompt the user to confirm the re-recording.

Even when an electromagnetic interference interrupts recording of the user-specified music (tune), the navigation apparatus 2 according to the first embodiment can automatically re-record or use a simple operation to re-record the music (tune), improving the usability.

While the navigation apparatus 2 according to the first embodiment performs the satellite digital radio recording process, the process from S220 to S250 functions as an audio control apparatus. The process at S260 and S270 functions as an interrupt listing means or unit. The process from S280 to S300 functions as a determination means or unit. The process from S310 to S370 functions as a first re-recording means or unit.

While there has been described the first embodiment, the present invention is not limited thereto but may be otherwise variously embodied.

According to the first embodiment, for example, the interrupted recording list registers the identification information (character code) for the music to be re-recorded. When the interrupted recording list registers the identification information (character code) for the music being received from the satellite digital radio apparatus 4, the reception data (music information and identification information) for that music is re-recorded on the hard disk 24. Let us suppose that a broadcast signal from a broadcast station contains program information about a program to be broadcast and the satellite digital radio apparatus 4 can restore the program information. The program information may be used to detect a date of broadcasting the music provided with its identification information registered to the interrupted recording list and reserve the music for recording. Alternatively, such recording reservation function may be added to the navigation apparatus 2 according to the first embodiment.

Figure 4:
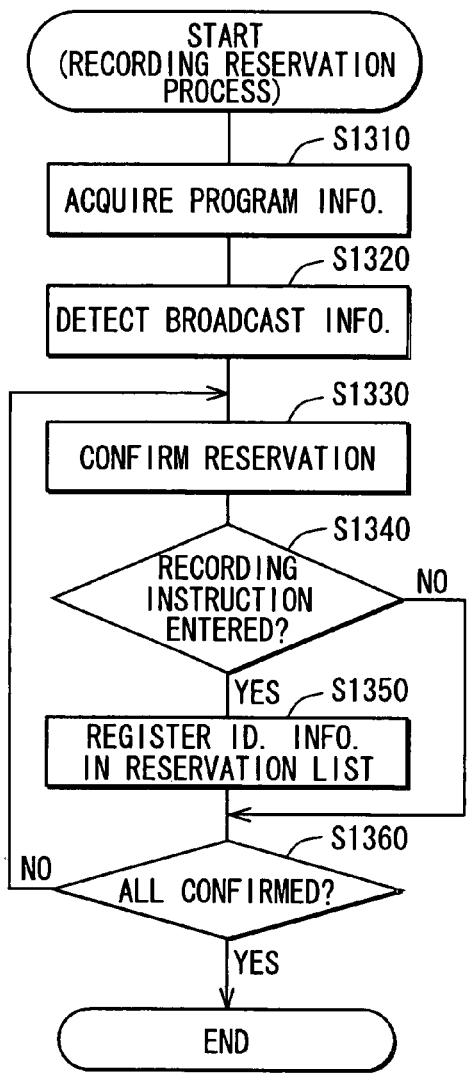
FIG. 4 is a flowchart showing a recording reservation process executed on the navigation apparatus according to the first embodiment.
Figure 5:
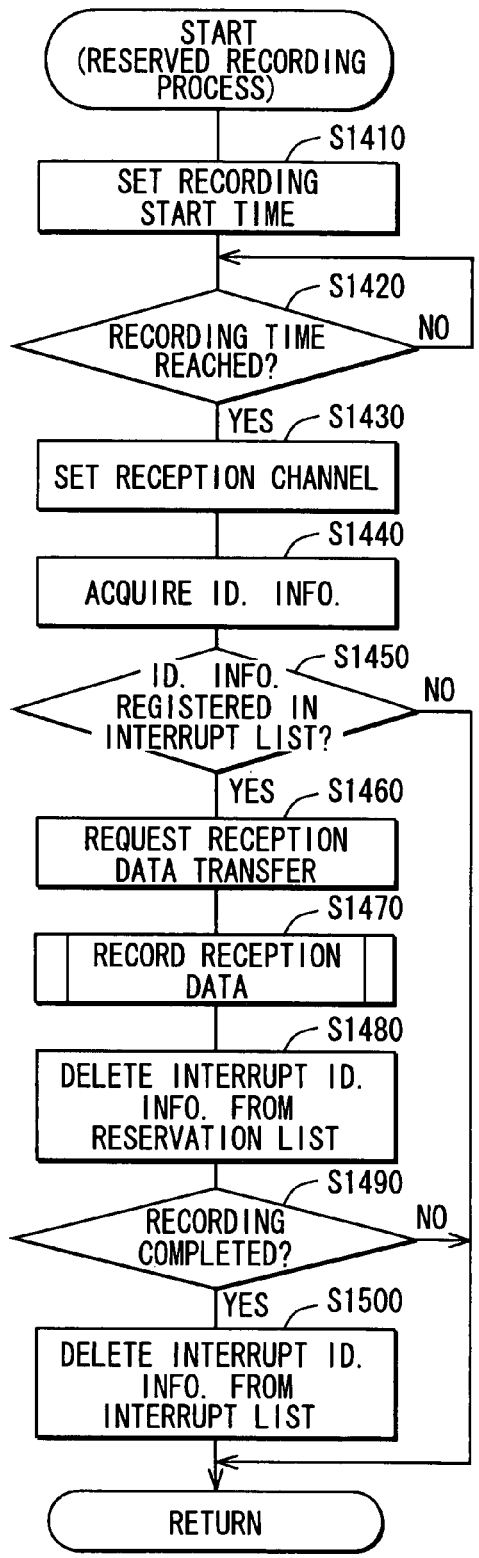
FIG. 5 is a flowchart showing a reserved recording process executed on the navigation apparatus according to the first embodiment.

The navigation apparatus 2 according to the first embodiment can implement such reserved recording just by allowing the control circuit 20 to perform the recording reservation process in FIG. 4 and the reserved recording process in FIG. 5. The recording reservation process and the reserved recording process will be described below.

The recording reservation process in FIG. 4 is performed when a user uses the operation switch group 26 to enter a reservation instruction. At S1310, the process starts to acquire program information from the satellite digital radio apparatus 4. At S1320, the process retrieves the acquired program information to detect a broadcast channel and a broadcast date for the music matching the identification information (character code) stored as the interrupt identification information in the interrupted recording list.

At S1330, the process allows the display device 28 to display a reservation confirmation image representing the identification information, broadcast channel, and broadcast date for the music whose broadcast channel and broadcast date are detected at S1320. At S1340, the process determines whether or not the user enters a recording instruction in accordance with the displayed reservation confirmation image.

When the user enters the recording instruction, the process proceeds to S1350 and registers the identification information, the broadcast channel, and the broadcast date for the music corresponding to the displayed reservation confirmation image in a recording reservation list storage area predetermined on the hard disk 24. The process then proceeds to S1360. When the user enters no recording instruction, the process directly proceeds to S1360.

At S1360, the process determines whether or not reservation of all pieces of music with broadcast channels and broadcast dates detected at S1320 is confirmed using the reservation confirmation image. When the reservation of all pieces of music is not confirmed, the process returns to S1330 and confirms the reservation of the unconfirmed music. When the reservation of all pieces of music is confirmed, the recording reservation process terminates.

The reserved recording process in FIG. 5 is repeatedly performed along with the satellite digital radio recording process in FIG. 3 when the recording reservation list storage area of the hard disk 24 registers at least one set of broadcast channel and date for the music to be recorded. At S1410, the process starts to read the broadcast channel and date for the music to be recorded from the recording reservation list. The process sets or changes the reception channel of the satellite digital radio apparatus 4 to the broadcast date. The process sets the recording start time needed to record the reception date for the music to be recorded.

At S1420, the process determines whether or not the recording start time is reached. When the recording start time is reached, the process proceeds to S1430 and sets the reception channel of the satellite digital radio apparatus 4 to the broadcast channel for the music to be recorded.

At S1440, the process acquires the identification information (character code) representing the music currently received from the satellite digital radio apparatus 4 so as to confirm the music received by the satellite digital radio apparatus 4. At S1450, the process determines whether or not the interrupted recording list registers the identification information acquired at S1440.

When the interrupted recording list does not register the identification information acquired from the satellite digital radio apparatus 4, the reserved recording process assumes the recording-reserved music not to be broadcast and then terminates. When the interrupted recording list registers the identification information acquired from the satellite digital radio apparatus 4, the process proceeds to S1460.

At S1460, the process transmits a reception data transfer request to the satellite digital radio apparatus 4. At S1470, the process acquires one tune of reception data transmitted from the satellite digital radio apparatus 4 in accordance with the transfer request. The process supplies the reception data with the identification information (character code) acquired at S1440 and records the data on the hard disk 24.

Upon completion of S1470, the process proceeds to S1480 and deletes the reservation information (broadcast channel and date) about the most recently recorded music from the recording reservation list stored in the hard disk 24. The process proceeds to S1490 and compares a data size of the music information stored in the hard disk 24 with a data size acquired from the identification information, for example. In this manner, the process determines whether one tune of the music information received by the satellite digital radio apparatus 4 is recorded completely or the recording of the music information is interrupted.

When one tune of the music information is completely recorded, the process proceeds to S500 and deletes the identification information corresponding to the currently recorded music stored as the interrupt identification information from the interrupted recording list in the hard disk 24. The satellite digital radio recording process then terminates. When the recording of the music information is interrupted, the satellite digital radio recording process terminates.

The recording reservation process in FIG. 4 detects the broadcast channel and date for the music to be re-recorded using the identification information (character code) and the program information about the music that is to be re-recorded and is registered in the interrupted recording list. The recording reservation process generates the recording reservation list by allowing the user to confirm whether or not to re-record the recording-interrupted music on the detected broadcast date. The reserved recording process re-records the interrupted music in accordance with the generated recording reservation list.

Even when an electromagnetic interference interrupts the recording of specified audio (music), the user can allow the navigation apparatus 2 to perform the recording reservation process and register the interrupted music to the recording reservation list. The user can record the interrupted music to the end.

When registering the reservation information (broadcast channel and date) to the recording reservation list, the recording reservation process in FIG. 5 allows the display device 28 to display the reservation confirmation image so that the user can confirm the reservation. However, the reservation confirmation is not always necessary. The reservation information may be automatically registered to the recording reservation list without the reservation confirmation.

The recording reservation process at S1310 in FIG. 4 functions as a program acquisition means or unit. The process at S1320 functions as a rebroadcasting detection means or unit. The recording reservation process from S1330 to S1360 and the reserved recording process function as a second audio re-recording means or unit.

According to the first embodiment, the navigation apparatus 2 functions as an audio control apparatus. The satellite digital radio apparatus 4 functions as a reception apparatus. However, a single audio system may implement these functions.

The first embodiment has described the satellite digital radio broadcast as an example of radio broadcast for transmitting the music information and the identification information. On the other hand, the invention can be applied to any apparatus that receives a broadcast for transmitting the music information and the identification information through radio waves. Examples include a reception apparatus that receives an FM broadcast for transmitting the music information (audio signal) and the identification information (character code).

Second Embodiment

Figure 6:
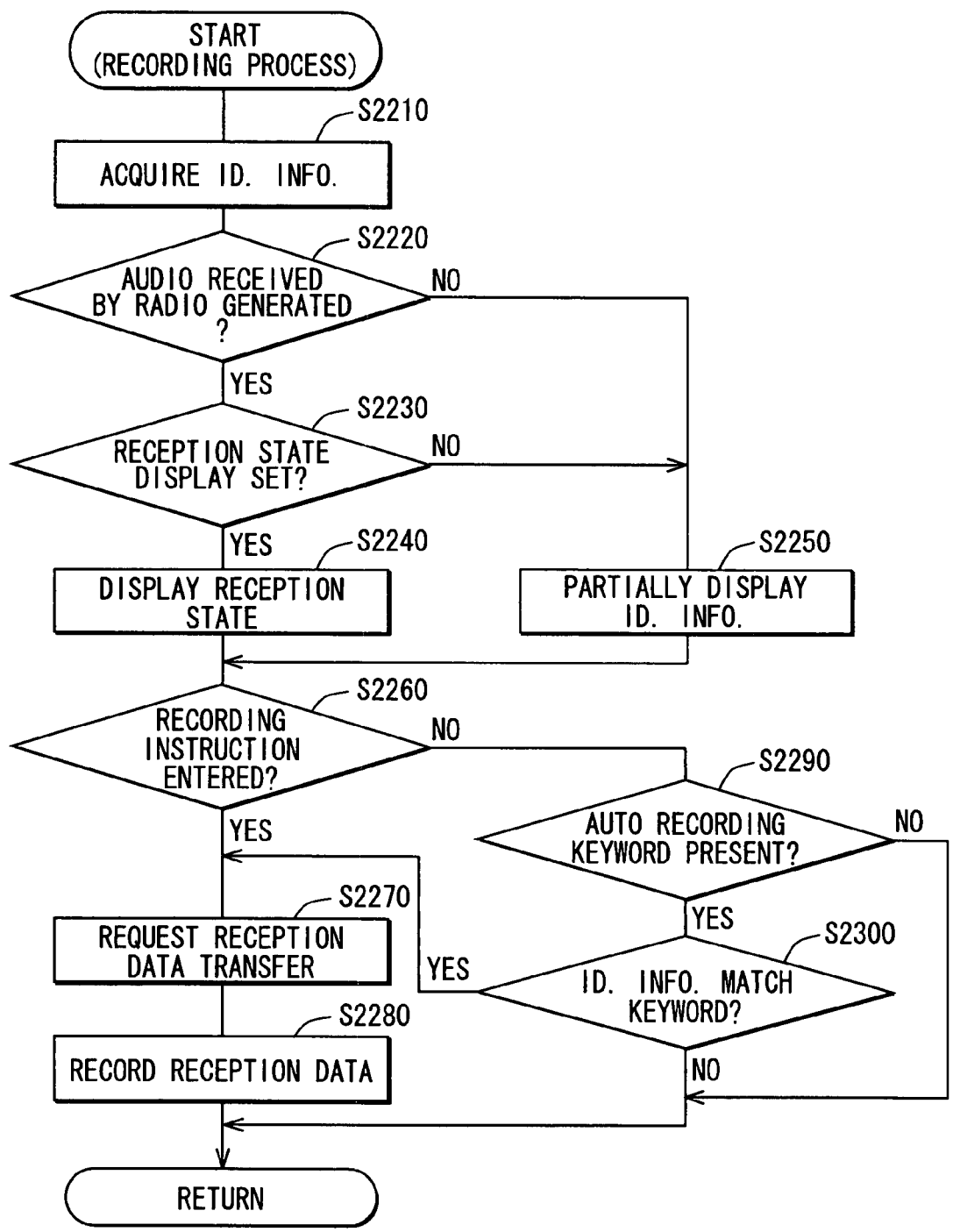
FIG. 6 is a flowchart showing a satellite digital radio recording process executed on a navigation apparatus according to a second embodiment.

The second embodiment will be described with reference to FIGS. 6 and 7. The constructions of FIGS. 1 and 2 according to the first embodiment also apply to the second embodiment. FIG. 6 is a flowchart showing a satellite digital radio recording process that is performed to implement the function as an audio control means or unit (or an audio control apparatus) in the navigation apparatus 2.

The control circuit 20 repeatedly performs the satellite digital radio recording process along with the other control processes for display and audio output as mentioned above. At S2210, the process starts and acquires the identification information representing the currently received music (specifically a character code decoded from the received identification information) from the satellite digital radio apparatus 4.

The process determines at S2220 whether or not the speaker 8 currently generates audio (music) of the satellite digital radio broadcast. When the speaker 8 currently generates audio (music) of the satellite digital radio broadcast, the process proceeds to S2230. The process determines whether or not a display screen of the display device 28 is configured to display a reception state of the satellite digital radio broadcast and the other information such as a navigation image.

When the display device 28 is configured to display the reception state of the satellite digital radio broadcast, the process displays the reception state thereof at S2240 and proceeds to S2260. Examples of the reception state include a reception channel currently selected on the satellite digital radio apparatus 4, the other selectable channels, and a tune name, artist name, and category of the currently received or broadcast music.

The process may determine at S2220 that the speaker 8 currently generates no audio (music) from the satellite digital radio broadcast. Further, the process may determine at S2230 that the display screen of the display device 28 is configured to display the other information such as a navigation image. In such case, the process proceeds to S2250 and allows the display device 28 to partially display the identification information acquired at S2210. Specifically, the identification information includes the tune name, artist name, and category of the music currently received by the satellite digital radio apparatus 4. In this manner, the process notifies the user or the vehicle's occupant of the identification information about the currently received identification information and proceeds to S2260.

To display the identification information, for example, the display device 28 contains one line of display area at the top or bottom of the display screen. The display area displays character information representing the tune name, artist name, category as the music identification information by horizontally scrolling the information.

According to the second embodiment, the process at S2250 for displaying the identification information and the display device 28 used for this display function as a broadcast notification means or unit.

At S2260, the process determines whether or not the operation switch group 26 as an input unit is used to enter an instruction for recording the satellite digital radio broadcast. When the recording instruction is entered, the process proceeds to S2270 and transmits a reception data transfer request to the satellite digital radio apparatus 4.

When the reception data transfer request is transmitted, the satellite digital radio apparatus 4 transmits the reception data equivalent to one currently received tune in accordance with the process at S170 in FIG. 2. At S2280, the process acquires the reception data transmitted from the satellite digital radio apparatus 4. The process supplies the reception data with the decoded identification information (character code) acquired at S2210 and stores the data in the hard disk 24. The satellite digital radio recording process then terminates.

When it is determined at S2260 that the recording instruction for the satellite digital radio broadcast is not entered, the process proceeds to S2290 and determines whether or not an automatic recording keyword is recorded on a specified area of the hard disk 24.

When no automatic recording keyword is recorded, the satellite digital radio recording process terminates. When the automatic recording keyword is recorded, the process proceeds to S2300 and determines whether or not the identification information (character code) acquired from the satellite digital radio apparatus at S2210 partially matches the automatic recording keyword. The determination at S2300 functions as a determination means or unit.

When it is determined at S2300 that the identification information (character code) acquired from the satellite digital radio apparatus partially matches the automatic recording keyword, the process proceeds to S2270 to record the music (tune) currently received by the satellite digital radio apparatus 4 on the hard disk 24. When it is determined at S2300 that the identification information (character code) acquired from the satellite digital radio apparatus does not partially match the automatic recording keyword, the satellite digital radio recording process terminates.

The automatic recording keyword is used as recording information for detecting the music to be automatically recorded from the music supplied by the satellite digital radio broadcast. For instance, the automatic recording keyword contains character codes representing the music's artist name and category.

Figure 7:
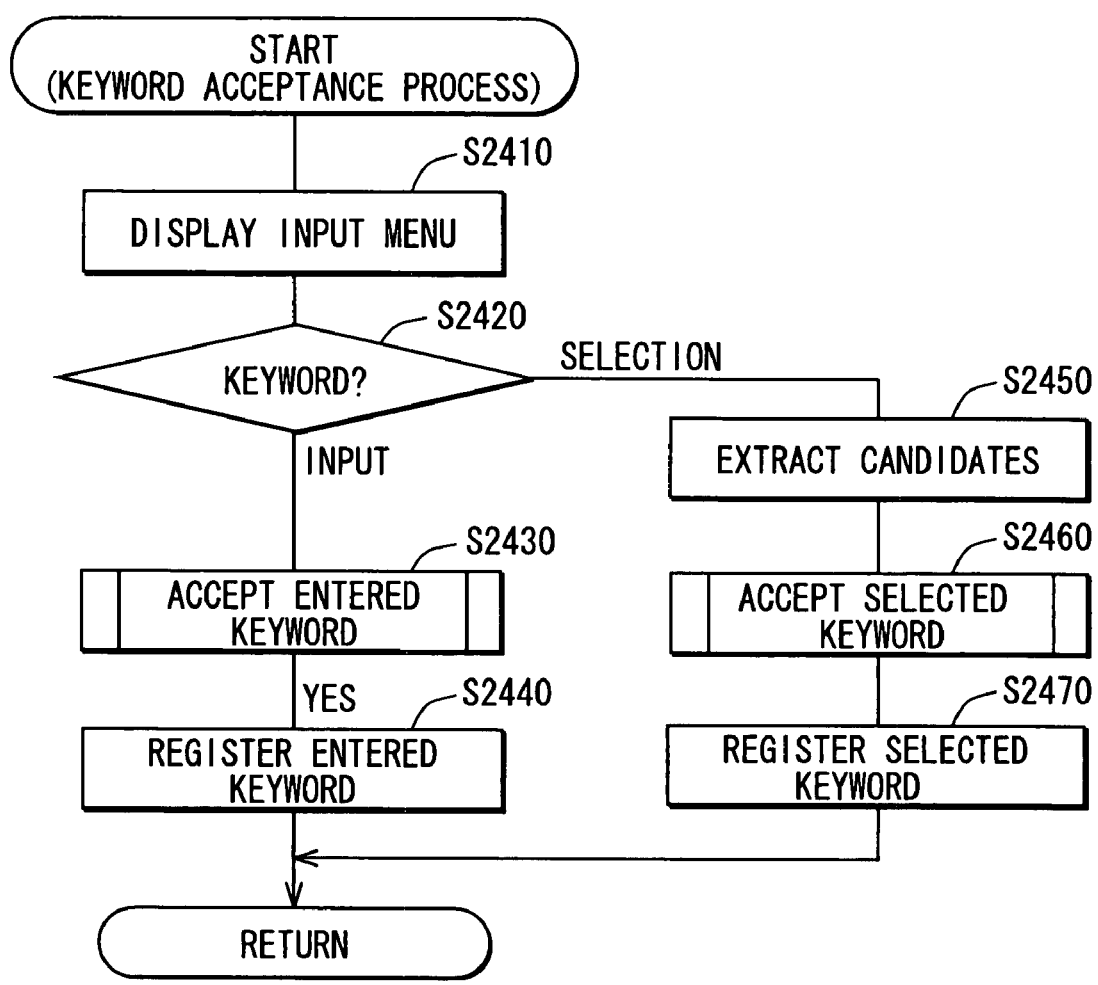
FIG. 7 is a flowchart showing an automatic recording keyword acceptance process executed on the navigation apparatus according to the second embodiment.

When the operation switch group 26 is used to enter an instruction for registering the keyword, the control circuit 20 performs an automatic recording keyword acceptance process in FIG. 7 to register the keyword to the hard disk 24.

The automatic recording keyword acceptance process first allows the display device 28 to display an input menu (S2410) so that the user can manually enter a keyword or select one of keywords already recorded on the hard disk 24. When a keyword is entered from the input menu (S2420 for input), the process performs an input acceptance process that allows the display device 28 to display an input image for entering a character keyword and accepting the entered keyword (S2430). The process registers the keyword accepted by the input acceptance process as an automatic recording keyword to the hard disk 24 (S2440). When the keyword selection is selected from the input menu (S2420 for selection), the process extracts the artist name or the category as a keyword candidate from the music identification information attached to the music data (reception data or CD data) recorded on the hard disk 24. The keyword candidate can be registered as a keyword. The process performs a selection acceptance process that allows the display device 28 to display the extracted keyword candidate and selecting a keyword (S2460). The process registers the keyword accepted by the selection acceptance process as an automatic recording keyword to the hard disk 24 (S2470).

In the onboard multimedia system according to the second embodiment, the satellite digital radio apparatus 4 always stores reception data (music information and identification information) restored by the satellite digital radio receiver 42 in the memory 46. When the user enters a recording instruction while listening to the satellite digital radio broadcast, the system reads the reception data equivalent to one tune being broadcast at that time from the memory 46. The data is transferred to the navigation apparatus 2 and is recorded on the hard disk of the navigation apparatus 2.

The user may not listen to the satellite digital radio broadcast when the speaker generates an audio other than the satellite digital radio broadcast or is disabled from generating an audio. In such case, the satellite digital radio apparatus 4 transmits the identification information about the currently received music (tune), more specifically, a character code decoded from the received identification information, to the navigation apparatus 2. The navigation apparatus 2 uses the display device 28 to display the identification information.

When the user views that display and enters the recording instruction, the navigation apparatus 2 reads the reception data equivalent to one tune received then by the satellite digital radio apparatus 4 from the memory 46 of the satellite digital radio apparatus 4. The reception data is transferred to the navigation apparatus 2 and is recorded on the hard disk 24 of the navigation apparatus 2.

According to the onboard multimedia system of the second embodiment, the user can recognize the music on the satellite digital radio even when he or she does not listen to the satellite digital radio. The user can record the music as needed on the hard disk 24 and expand opportunities for recording the music on the satellite digital radio.

According to the onboard multimedia system of the second embodiment, the user can use the operation switch group 26 to register a keyword for the music as recording information so that the navigation apparatus 2 automatically records that music. The system detects the music corresponding to the keyword from the music received by the satellite digital radio apparatus 4. The reception data for that music is automatically recorded on the hard disk 24.

According to the onboard multimedia system of the second embodiment, the user can more reliably record the intended music by registering the keyword for the music to be recorded automatically. The user can more effectively use the recording function of the navigation apparatus 2.

To reproduce the reception data recorded on the hard disk according to the second embodiment, the user just needs to use the operation switch group 26 to supply the navigation apparatus 2 with an instruction for reproducing the reception data. Based on the reproduction instruction, the control circuit 20 of the navigation apparatus 2 reads the reception data to be reproduced from the hard disk 24. The control circuit 20 transmits the reception data together with a reception data reproduction request to the satellite digital radio apparatus 4. The control circuit 40 of the satellite digital radio apparatus 4 performs the above-mentioned decode process to decode the reception data transmitted from the navigation apparatus 2. The decoded audio signal is output to the audio amplifier 10. The speaker 8 generates the reproduced audio (music).

While there has been described the second embodiment, the present invention is not limited thereto but may be otherwise variously embodied.

The second embodiment has described the system having one satellite digital radio apparatus 4. It may be preferable to provide multiple satellite digital radio apparatuses 4 that select different broadcast channels. The user can be notified of the identification information about the music broadcast on the different channels and choose from more music candidates for recording.

According to the second embodiment, the navigation apparatus 2 functions as an audio control apparatus. The satellite digital radio apparatus 4 functions as a reception apparatus. The audio amplifier 10 and the speaker 8 function as an audio output apparatus. A single audio system may implement these functions. Alternatively, the audio amplifier may function as the audio control apparatus and the audio output apparatus. The audio amplifier and the satellite digital radio apparatus may configure the audio system.

The second embodiment has described the satellite digital radio broadcast as an example of radio broadcast for transmitting the music information and the identification information. On the other hand, the invention can be applied to any apparatus that receives a broadcast for transmitting the music information and the identification information through radio waves. Examples include a reception apparatus that receives an FM broadcast for transmitting the music information (audio signal) and the identification information (character code).

Third Embodiment

The third embodiment will be described with reference to FIG. 8. The construction of FIG. 1 according to the first embodiment also apply to the third embodiment. Further, the following is explanation in the configuration of the third embodiment regarding features additional to those of the first embodiment.

The hard disk 24 functions as a recording medium. For example, the hard disk 24 contains two types of tune data recording areas. One is a radio recording area for recording the reception data (music information and identification information) received by the satellite digital radio apparatus 4 in units of tunes. The other is a CD recording area for recording CD data (music information) read from a music CD in units of tunes.

The hard disk 24 also records a CD database that stores the identification information (e.g., tune name, artist name album name, and category) about the music recorded on a commercially available music CD. The control circuit 20 reads the identification information about the music recorded on the music CD from the CD database. The control circuit 20 then records, as tune data, the identification information and the CD data (music information) read from the music CD on the CD recording area of the hard disk 24 in units of tunes.

In the onboard multimedia system of the third embodiment, the user enters a recording instruction using the operation switch group 26. Based on the instruction, the navigation apparatus 2 records the tune data (audio information and identification information) about the music received by the satellite digital radio apparatus 4 or recorded on the music CD on the radio recording area or the CD recording area of the hard disk 24.

The control circuit 40 also provides transmission control for reading the reception data from the memory 46 in units of tunes according to a request from the navigation apparatus 2 and transmitting the data to the navigation apparatus 2.

The memory 46 temporarily stores reception data so as to be able to read tune data (audio information and identification information) equivalent to one tune being received in accordance with a request from the navigation apparatus 2. The memory 46 is configured to have a capacity large enough to record one or more music tunes each of which replays several to ten or more minutes, for example. When writing the reception data to the memory 46 decreases a free space in it, the control circuit 40 deletes earlier reception data to always record the most recent reception data.

The navigation apparatus 2 controls the audio amplifier 10 in accordance with an audio output (or change) instruction entered from the operation switch group 26. In this manner, the navigation apparatus 2 also functions as an audio control means or unit (or an audio control apparatus) that uses the speaker 8 to generate audio based on the tune data recorded on the corresponding area of the hard disk 24, audio received by the satellite digital radio apparatus 4, radio audio received by the audio reproduction apparatus 6, or audio reproduced from a music CD. Further, the control circuit 20 of the navigation apparatus 2 functions as an output control means or unit.

Figure 8:
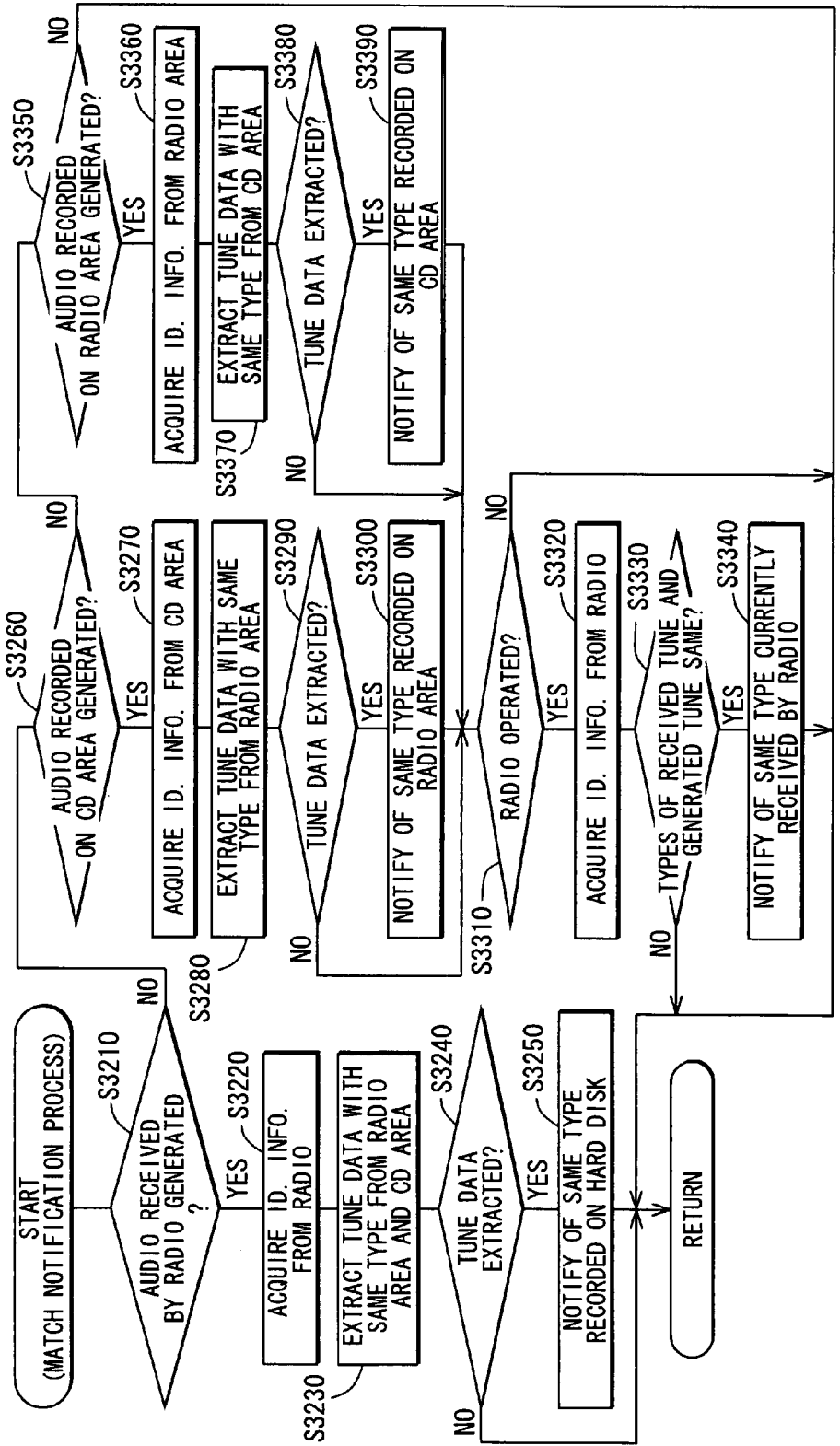
FIG. 8 is a flowchart showing a match notification process executed on a navigation apparatus according to a third embodiment.

While the speaker 8 generates an audio, the control circuit 20 of the navigation apparatus 2 performs a match notification process in FIG. 8 independently of processes for driving control and the like. The match notification process will be described below.

As shown in FIG. 8, the match notification process determines at S3210 whether or not the speaker 8 currently generates an audio received by the satellite digital radio apparatus 4.

When the speaker 8 currently generates an audio received by the satellite digital radio apparatus 4, the process proceeds to S3220 and acquires the identification information about the currently received tune, i.e., the currently audibly output music. At S3230, the process searches the radio recording area and the CD recording area of the hard disk and extracts tune data whose retrieval type matches that of the tune being received.

The retrieval type includes one or more items selected from the tune name, artist name, and category as the music identification information. The user can use the operation switch group 26 to freely specify the item. When the artist name is specified as the retrieval type, for example, the process retrieves a tune with the same artist name as the received tune from the hard disk 24 at S3230.

When the retrieval at S3230 terminates, the process determines at S3240 whether or not to extract tune data with the same retrieval type as that of the tune being received. When such tune data is not extracted, the process terminates. When such tune data is extracted, the process proceeds to S3250 and notifies the user (occupant) that the hard disk 24 records the tune with the same retrieval type as that of the tune being received. The display device 28 displays this notification. The process then terminates.

Notification to the user may simply display a message showing the presence of the tune with the matching retrieval type or display a list of extracted tunes. The third embodiment allows the user to choose from these methods.

When it is determined at S3210 that the audio output from the speaker 8 differs from that received by the satellite digital radio apparatus 4, the process proceeds to S3260. The process then determines whether or not the audio output from the speaker 8 corresponds to an audio reproduced from the tune data recorded on the CD recording area of the hard disk 24, i.e., whether or not data recorded on the CD is currently reproduced.

When the data recorded on the CD is currently reproduced, the process proceeds to S3270 and acquires the identification information about the currently reproduced tune from the CD recording area of the hard disk 24. At S3280, the process searches the radio recording area as another tune data recording area on the hard disk 24 and extracts tune data with the same retrieval type as that of the currently reproduced tune.

At S3290, the process determines whether or not the search at S3280 extracts tune data with the same retrieval type as that of the currently reproduced tune. When such tune data is not extracted, the process proceeds to S3310. When such tune data is extracted, the process proceeds to S3300 and notifies the user that the radio recording area records the tune with the same retrieval type as that of the tune currently reproduced from the CD recording area. This notification is displayed. The process then proceeds to S3310.

At S3310, the process determines whether or not the satellite digital radio apparatus 4 operates currently. When the satellite digital radio apparatus 4 does not operate, the process terminates. The satellite digital radio apparatus 4 stops when the user turns it off. When the satellite digital radio apparatus 4 operates, the process proceeds to S3320 and acquires the identification information about the currently received tune (not audibly output) from the satellite digital radio apparatus 4.

At S3330, the process uses the identification information acquired at S3320 and the identification information acquired at S3270 about the currently reproduced tune to determine whether or not there is a match between retrieval types for the tune currently received by the satellite digital radio apparatus 4 and the tune being audibly output. When the match is not found, the process terminates. When the match is found, the process proceeds to S3340 and notifies the user that the satellite digital radio broadcast currently delivers the tune with its retrieval type matching that of the currently reproduced tune. The display device 28 displays this notification. The process then terminates.

At S3260, the process may determine that the speaker 8 does not generate an audio reproduced from the tune data recorded on the CD recording area, i.e., the CD-recorded data is not currently reproduced. The process then proceeds to S3350 and determines whether or not the speaker 8 generates an audio reproduced from the tune data recorded on the radio recording area of the hard disk 24, i.e., the radio-recorded data is currently reproduced.

When the radio-recorded data is not currently reproduced, the process terminates. When the radio-recorded data is currently reproduced, the process proceeds to S3360 and acquires the identification information about the currently reproduced tune from the radio recording area of the hard disk 24. At S3370, the process searches for the CD recording area as the other tune data recording area of the hard disk 24 and extracts tune data with the same retrieval type as that of the currently reproduced tune.

At S3380, the process determines whether or not the search at S3370 extracts tune data with the same retrieval type as that of the currently reproduced tune. When such tune data is not extracted, the process proceeds to S3310. When such tune data is extracted, the process proceeds to S3390 and notifies the user that the CD recording area records the tune with the same retrieval type as that of the tune currently reproduced from the radio recording area. This notification is displayed. The process then proceeds to S3310.

At S3310 to S3340, the process determines whether or not there is a match between retrieval types for the tune currently received by the satellite digital radio apparatus 4 and the tune being audibly output. When the match is found, the process performs a process for notifying the user of this state. The process then terminates.

According to the third embodiment as mentioned above, a tune received by the satellite digital radio apparatus 4 may be audibly output. A tune recorded on the CD recording area of the hard disk 24 may be audibly output. A tune recorded on the radio recording area of the hard disk 24 may be audibly output. The process determines whether or not a tune with the retrieval type matching that of the currently reproduced tune is available from a different information source among these three information sources. The determination result is notified to the user.

While listening to the music recorded on the hard disk 24, the user can recognize that the satellite digital radio broadcasts the music with the same retrieval type as that of the music he or she listens to. The user can switch an audio output to the satellite digital radio apparatus 4 and listen to the music. Alternatively, the user can enter a recording instruction and record the music on the hard disk 24.

While listening to the music received by the satellite digital radio apparatus 4, the user can recognize that the hard disk 24 records the music with the same retrieval type as that of the music he or she listens to. The user can switch an audio output to the hard disk 24 and continue to listen to the same type of music. The user can confirm whether or not the hard disk 24 records the broadcast music. The user can record that music when not recorded.

When listening to the music recorded on the radio recording area or the CD recording area of the hard disk 24, the user can recognize that the music information with the same type as that music is recorded on the other recording area (CD recording area or radio recording area) of the hard disk 24. For example, the user can select and reproduce only the music with the same identification information such as the tune name, artist, or category from the music recorded on the recording areas. Moreover, the user can find duplicate tune data and delete unnecessary data.

The onboard multimedia system according to the third embodiment can correlate pieces of music available from the three information sources with each other and improve the convenience of using these pieces of music.

In the third embodiment, the process from S3210 to S3250 functions as a first match notification means or unit. The process at S3271, S3360, and S3310 through S3340 functions as a second match notification means or unit. The process from S3260 to S3300 and from S3350 to S3390 functions as a third match notification means or unit.

While there has been described the third embodiment, the present invention is not limited thereto but may be otherwise variously embodied.

For example, the embodiment provides the notification at S3250, S3300, S3340, and S3390 by displaying a message on the display device 28. However, the notification may be provided audibly. Further, the user may select the visual or audible notification.

The navigation apparatus as the audio control apparatus can be designed to acquire the music information from information sources such as music tape, CD, and MD other than the reception apparatus. When an instruction is entered for recording the music information from the information source, the navigation apparatus 2 records the music information on the hard disk 24. When an instruction is entered for sounding the music from the information source, the navigation apparatus 2 allows the audio amplifier 10 to generate an audio based on the music information from the information source using the speaker 8.

According to the third embodiment, the navigation apparatus 2 functions as an audio control apparatus. The satellite digital radio apparatus 4 functions as a reception apparatus. The audio amplifier 10 and the speaker 8 function as an audio output apparatus. The hard disk 24 functions as a recording medium. A single audio system may implement these functions. Alternatively, the audio amplifier may function as the audio control apparatus and the audio output apparatus. The audio amplifier and the satellite digital radio apparatus may configure the audio system.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. An audio control apparatus connected with a reception apparatus for receiving an airwave containing music information as an audio signal of music and identification information about the music and for restoring music information and identification information from the received signal, the audio control apparatus acquiring, when supplied with a recording instruction from outside, music information on a tune basis specified by the identification information from the reception apparatus to thereby record the acquired music information on a recording medium, the audio control apparatus comprising:
an interrupt listing unit that (i) acquires, from the reception apparatus, identification information corresponding to the music information to be recorded by the audio control apparatus on a recording medium, (ii) determines whether or not one tune of the music information is recorded on the recording medium, and, (iii) when one tune of the music information is not recorded and recording is interrupted, stores the acquired identification information as interrupt identification information about incompletely recorded music in an interrupt list storage unit;
a determination unit that sequentially acquires identification information about music currently received from the reception apparatus and determines a match whether the acquired identification information matches the interrupt identification information stored in the interrupt list storage unit; and
a first re-recording unit that, when the determination unit determines the match, acquires music information from the reception apparatus and records it on the recording medium and, when it is determined thereafter that one tune of the music information is recorded on the recording medium, deletes the interrupt identification information about recorded music from the interrupt list storage unit.

2. The audio control apparatus of claim 1,
wherein, when the determination unit determines the match, the first re-recording unit notifies a user whether or not to re-record music specified by the identification information and starts re-recording the music information in response to a re-recording instruction supplied from outside thereafter.

3. An audio system comprising:
a reception apparatus that receives an airwave containing music information as an audio signal of music and identification information about the music and restores music information and identification information from the received signal; and
the audio control apparatus of claim 1 connected with the reception apparatus.

4. A navigation apparatus provided in a vehicle for providing an occupant with driving guidance, the navigation apparatus comprising: all the units included in the audio control apparatus of claim 1.

5. An audio control apparatus connected with a reception apparatus for receiving an airwave containing music information as an audio signal of music and identification information about the music and for restoring music information and identification information from the received signal, the audio control apparatus acquiring, when supplied with a recording instruction from outside, music information on a tune basis specified by the identification information from the reception apparatus to thereby record the acquired music information on a recording medium,
the audio control apparatus comprising:
an interrupt listing unit that (i) acquires, from the reception apparatus, identification information corresponding to the music information to be recorded by the audio control apparatus on a recording medium, (ii) determines whether or not one tune of the music information is recorded on the recording medium, and, (iii) when one tune of the music information is not recorded and recording is interrupted, stores the acquired identification information as interrupt identification information about incompletely recorded music in an interrupt list storage unit;
a program acquisition unit that acquires program information about broadcast programs that the reception apparatus to receive;
a rebroadcasting detection unit that detects a date of rebroadcasting the incompletely recorded music based on the program information and the interrupt identification information stored in the interrupt list storage unit; and
a second re-recording unit that acquires the music information about the incompletely recorded music from the reception apparatus and records the information on the recording medium at a rebroadcasting date detected by the rebroadcasting detection unit, and when it is determined thereafter that one tune of the music information is recorded on the recording medium, deletes the interrupt identification information from the interrupt list storage unit.

6. The audio control apparatus of claim 5,
wherein, when the rebroadcasting detection unit detects the date of rebroadcasting, the second re-recording unit notifies a user whether or not to re-record the incompletely recorded music at the rebroadcasting date detected by the rebroadcasting detection unit and starts re-recording the music information in response to a re-recording instruction supplied from outside thereafter.

7. The audio control apparatus of claim 5, further comprising:
a reception unit having functions of the reception apparatus and configured to sequentially restore music information from the received signal and concurrently stores the restored music information in a storage section, and when the music information is requested, reads the requested music information from the storage section, and supplies the read music information from the beginning of a tune.

8. An audio system comprising:
a reception apparatus that receives an airwave containing music information as an audio signal of music and identification information about the music and restores music information and identification information from the received signal; and
the audio control apparatus of claim 5 connected with the reception apparatus.

9. A navigation apparatus provided in a vehicle for providing an occupant with driving guidance, the navigation apparatus comprising: all the units included in the audio control apparatus of claim 5.

10. An audio control apparatus connected with an audio output apparatus for generating an audio and with a reception apparatus for receiving an airwave containing music information as an audio signal of music and identification information about the music and for restoring music information and identification information from the received signal,
the audio control apparatus comprising:
an input unit for accepting various instructions from outside, wherein the music information is acquired from the reception apparatus to be recorded on a recording medium in response to an instruction supplied via the input unit for recording received music, and the audio output apparatus is allowed to output an audio based on music information restored by the reception apparatus or recorded on the recording medium in response to an instruction supplied via the input unit for outputting received music or recorded music; and
a broadcast notification unit that, when the audio output apparatus does not output an audio based on music information restored by the reception apparatus, acquires the identification information from the reception apparatus and notifies a user of music being or to be broadcast based on the identification information,
wherein, when a recording instruction for the music notified by the broadcast notification unit is supplied via the input unit, music information is acquired from the reception apparatus and recorded on the recording medium.

11. The audio control apparatus of claim 10 capable of acquiring music information from an information source different from the reception apparatus,
wherein the audio control apparatus acquires music information from the information source in response to an instruction supplied via the input unit for recording music information from the information source and allows the audio output apparatus to generate an audio based on music information from the information source in response to an instruction supplied via the input unit for outputting music from the information source.

12. The audio control apparatus of claim 10, further comprising:
a determination unit that, when recording information indicating music information to be automatically recorded is supplied via the input unit, compares the identification information with the recording information and determines whether or not to automatically record the music information being received by the reception apparatus each time the broadcast notification unit acquires the identification information from the reception apparatus, wherein, when the determination unit determines that the reception apparatus is receiving music information to be automatically recorded, the audio control apparatus acquires music information corresponding to the identification information from the reception apparatus and records the music information on the recording medium.

13. The audio control apparatus of claim 10 comprising a reception unit functioning as the connected reception apparatus, wherein the reception unit includes a storage section for temporarily storing the music information, and sequentially restores the music information from the received signal while storing the music information in the storage section, and wherein the reception unit reads requested music information from the storage section to supply the music information from the beginning of a tune.

14. An audio system comprising:
an audio output apparatus that generates an audio;
a reception apparatus that receives an airwave containing music information as an audio signal of music and identification information about the music and restores music information and identification information from the received signal; and
the audio control apparatus of claim 10 connected with the audio output apparatus and the reception apparatus.

15. A navigation apparatus provided in a vehicle for providing an occupant with driving guidance, the navigation apparatus comprising: all the units included in the audio control apparatus of claim 10.

16. An audio control apparatus connected with (i) an audio output apparatus for generating an audio, (ii) a reception apparatus for receiving an airwave containing music information as an audio signal of music and identification information about the music and for restoring music information and identification information from the received signal, and (iii) a recording medium for recording tune data including the music information and the identification information on a tune basis, the audio control apparatus comprising:
an output control unit that allows the audio output apparatus to output one of audios based on (i) music information restored by the reception apparatus and (ii) music information recorded on the recording medium, in accordance with an instruction from outside; and
a first match notification unit that (i) acquires, from the recording medium, identification information corresponding to music information, which is recorded on the recording medium and associated with an audio currently output from the audio output apparatus, (ii) determines based on the acquired identification information whether or not the reception apparatus receives music information belonging to a same type as the currently audibly output music, and (iii) notifies a user that the reception apparatus receives music information belonging to the same type as the currently audibly output music.

17. The audio control apparatus of claim 16, further comprising:
a second match notification unit that (i) acquires, from the reception apparatus, identification information corresponding to music information, which is restored by the reception apparatus and associated with an audio output from the audio output apparatus, (ii) uses the acquired identification information to extract tune data of a same type as that of currently audibly output music from tune data recorded on the recording medium, and (iii) notifies a user of an extraction result.

18. The audio control apparatus of claim 16,
wherein the recording medium includes a plurality of recording areas for recording tune data acquired from different information sources,
the audio control apparatus further comprises:
a third match notification unit that (i) acquires, from the recording medium, identification information corresponding to music information, which is recorded on the recording medium and associated with an audio output from the audio output apparatus, (ii) uses the acquired identification information to extract tune data of a same type as that of currently audibly output music from tune data recorded on a recording area of the recording medium different from a recording area used for the identification information, and (iii) notifies a user of an extraction result.

19. An audio system comprising:
an audio output apparatus that generates an audio;
a reception apparatus that receives an airwave containing music information as an audio signal of music and identification information about the music and restores music information and identification information from the received signal;
a recording medium that records tune data including the music information and the identification information on a tune basis, wherein the audio output apparatus to output one of audios based on music information restored by the reception apparatus and based on music information recorded on the recording medium in accordance with an instruction from outside; and
the audio control apparatus of claim 16 connected with the audio output apparatus, the reception apparatus, and the recording medium.

20. A navigation apparatus provided in a vehicle for providing an occupant with driving guidance, the navigation apparatus comprising: all the units included in the audio control apparatus of claim 16.

21. An audio control apparatus connected with (i) an audio output apparatus for generating an audio, (ii) a reception apparatus for receiving an airwave containing music information as an audio signal of music and identification information about the music and for restoring music information and identification information from the received signal, and (iii) a recording medium for recording tune data including the music information and the identification information on a tune basis, the audio control apparatus comprising:
an output control unit that allows the audio output apparatus to output one of audios based on music information restored by the reception apparatus and based on music information recorded on the recording medium in accordance with an instruction from outside; and
a second match notification unit that (i) acquires, from the reception apparatus, identification information corresponding to music information restored by the reception apparatus and associated with an audio output from the audio output apparatus, (ii) uses the acquired identification information to extract tune data of a same type as that of currently audibly output music from tune data recorded on the recording medium, and (iii) notifies a user of an extraction result.

22. The audio control apparatus of claim 21, wherein the recording medium includes a plurality of recording areas for recording tune data acquired from different information sources, the audio control apparatus further comprises:

a third match notification unit that (i) acquires, from the recording medium, identification information corresponding to music information recorded on the recording medium and associated with an audio output from the audio output apparatus, (ii) uses the acquired identification information to extract tune data of a same type as that of currently audibly output music from tune data recorded on a recording area of the recording medium different from a recording area used for the identification information, and (iii) notifies a user of an extraction result.

23. An audio system comprising:

an audio output apparatus that generates an audio;

a reception apparatus that receives an airwave containing music information as an audio signal of music and identification information about the music and restores music information and identification information from the received signal;

a recording medium that records tune data including the music information and the identification information on a tune basis, wherein the audio output apparatus to output one of audios based on music information restored by the reception apparatus and based on music information recorded on the recording medium in accordance with an instruction from outside; and the audio control apparatus of claim 21 connected with the audio output apparatus, the reception apparatus, and the recording medium 24. A navigation apparatus provided in a vehicle for providing an occupant with driving guidance, the navigation apparatus comprising: all the units included in the audio control apparatus of claim 21.

25. An audio control apparatus connected with (i) an audio output apparatus for generating an audio, (ii) a reception apparatus for receiving an airwave containing music information as an audio signal of music and identification information about the music and for restoring music information and identification information from the received signal, and (iii) a recording medium for recording tune data including the music information and the identification information on a tune basis, wherein the recording medium includes a plurality of recording areas for recording tune data acquired from different information sources, the audio control apparatus comprises:

an output control unit that allows the audio output apparatus to output one of audios based on music information restored by the reception apparatus and based on music information recorded on the recording medium in accordance with an instruction from outside; and a third match notification unit that (i) acquires, from the recording medium, identification information corresponding to music information recorded on the recording medium and associated with an audio output from the audio output apparatus, (ii) uses the acquired identification information to extract tune data of the same type as that of currently audibly output music from tune data recorded on a recording area of the recording medium different from a recording area used for the identification information, and (iii) notifies a user of an extraction result.

26. An audio system comprising:

an audio output apparatus that generates an audio;

a reception apparatus that receives an airwave containing music information as an audio signal of music and identification information about the music and restores music information and identification information from the received signal;

a recording medium that records tune data including the music information and the identification information on a tune basis, wherein the audio output apparatus to output one of audios based on music information restored by the reception apparatus and based on music information recorded on the recording medium in accordance with an instruction from outside; and the audio control apparatus of claim 25 connected with the audio output apparatus, the reception apparatus, and the recording medium.

27. A navigation apparatus provided in a vehicle for providing an occupant with driving guidance, the navigation apparatus comprising: all the units included in the audio control apparatus of claim 25.

\* \* \* \* \*